(12) United States Patent
DeBusk

(10) Patent No.: US 7,632,407 B1
(45) Date of Patent: Dec. 15, 2009

(54) RAPID PROLIFERATION OF AQUATIC PLANT GROWTH FACILITATION SYSTEM AND ASSOCIATED METHODS

(76) Inventor: Thomas A. DeBusk, 3208 Westchester Dr., Cocoa, FL (US) 32926

( * ) Notice: Subject to any disclaimer, the term of this patent is extended or adjusted under 35 U.S.C. 154(b) by 176 days.

(21) Appl. No.: 11/833,551

(22) Filed: Aug. 3, 2007

Related U.S. Application Data

(60) Provisional application No. 60/821,641, filed on Aug. 7, 2006, provisional application No. 60/912,544, filed on Apr. 18, 2007.

(51) Int. Cl.
*C02F 3/32* (2006.01)
(52) U.S. Cl. .................... 210/602; 210/631; 210/170.05
(58) Field of Classification Search ............... 210/602, 210/631, 747, 170.03, 170.05, 198.1, 242.1; 47/59 R, 64
See application file for complete search history.

(56) References Cited

U.S. PATENT DOCUMENTS

| | | | | |
|---|---|---|---|---|
| 4,536,988 A | * | 8/1985 | Hogen | ............... 47/1.5 |
| 5,096,577 A | | 3/1992 | Ngo et al. | |
| 5,180,501 A | | 1/1993 | Ngo et al. | |
| 5,256,281 A | * | 10/1993 | Ngo et al. | ............... 210/151 |
| 5,264,127 A | | 11/1993 | Ngo et al. | |
| 5,342,512 A | | 8/1994 | Ngo et al. | |
| 5,409,601 A | | 4/1995 | Ngo et al. | |
| 6,322,699 B1 | * | 11/2001 | Fernandez | ............... 210/602 |
| 2006/0243659 A1 | * | 11/2006 | Svirklys et al. | ............... 210/602 |

FOREIGN PATENT DOCUMENTS

JP 6-106185 A * 4/1994

* cited by examiner

*Primary Examiner*—Fred Prince
(74) *Attorney, Agent, or Firm*—Jacqueline E. Hartt; Lowndes, Drosdick, Doster, Kantor & Reed, P.A.

(57) ABSTRACT

A system and method for facilitating the rapid proliferation of floating aquatic plants on a body of water for use in bioremediation are provided. In a particular embodiment, a method includes the steps of affixing a weight to each of a plurality of floating aquatic plants and distributing a plurality of weighted plants across a body of water so that at least some of the plants are sufficiently spatially distributed so as to avoid interfering with each other in an initial growth phase. The weighted plants are permitted to produce daughter plants and to substantially cover a surface of the body of water. Water desired to be treated for excess nutrients is channeled to the body of water for bioremediation by the plants, and treated water is then channeled out from the body of water.

25 Claims, 2 Drawing Sheets

RAPID PROLIFERATION OF AQUATIC PLANT GROWTH FACILITATION SYSTEM AND ASSOCIATED METHODS

CROSS-REFERENCE TO RELATED APPLICATION

This application claims priority to provisional application Ser. No. 60/821,641, filed Aug. 7, 2006, and Ser. No. 60/912,544, filed Apr. 18, 2007.

BACKGROUND OF THE INVENTION

1. Field of the Invention

The present invention relates to remediation of bodies of water, and, more particularly, to wetland technologies for such remediation, and, most particularly, to the use of wetland plants in large subsidiary bodies of water for such remediation.

2. Description of Related Art

In order to remove nutrients from a body of water, it is known in the art to use macrophytes, that is, wetland plants, the root zones of which remove these nutrients from the water body. The macrophyte vegetation takes up the soluble nutrients as a function of their growth.

Many types of floating vegetation, particularly large-leaved species such as water hyacinth (*Eichhomia crassipes*), pennywort (*Hydrocotyle* sp.), and water lettuce (*Pistia stratiotes*), have been utilized for enhancing the quality of surface waters and wastewaters. The plants improve water quality in part by virtue of their rapid vegetative growth rates and high nutrient assimilative capacity.

Such floating plants spread primarily by vegetative means, and can rapidly cover the surface of a water body due to their rapid replication (specific growth) rates. In natural water bodies, such floating plants usually are considered noxious aquatic weeds.

In relatively large bodies of water, however, complete coverage of floating plants typically does not occur quickly because of their tendency to be transported by winds and currents, which can effectively compress plants onto one side of a water body. When compacted in such a fashion, many floating plants (e.g., water hyacinths) tend to increase their biomass by growing taller, rather than spreading horizontally by producing additional small (daughter) plants. Once plants are tall and compacted, this often compromises their ability to colonize the entire water body.

Other factors that can slow or totally arrest the proliferation of floating plants are the presence of disease organisms or arthropod pests, or an inadequate complement of nutrients in the water body.

In water and wastewater treatment applications, where it is desirable to achieve total coverage of floating plants as rapidly as possible, one solution has been to cover large bodies of water with floating containment grids that are anchored in place. This effectively creates smaller chambers for the plants to fill.

However, with extremely large bodies of water, it is impractical to cover the water surface with a sufficiently fine grid that the compression effect does not still limit plant growth.

Therefore, it would be desirable to provide a system and method for facilitating the rapid proliferation of floating aquatic plants, particularly on large bodies of water.

SUMMARY OF THE INVENTION

The present invention is directed to a system and method for facilitating the rapid proliferation of floating aquatic plants on a body of water for use in bioremediation. In a particular embodiment, a method comprises the step of distributing a plurality of plants across a body of water so that at least some of the plants are sufficiently spatially distributed so as to avoid interfering with each other in an initial growth phase. The plants have affixed thereto a means for retaining them in a desired sector of the body of water. The plants are permitted to produce daughter plants and to substantially cover a surface of the body of water.

Water desired to be treated for excess nutrients is channeled to the body of water for bioremediation by the plants, and treated water is then channeled out from the body of water.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1-4.

Figure 1:
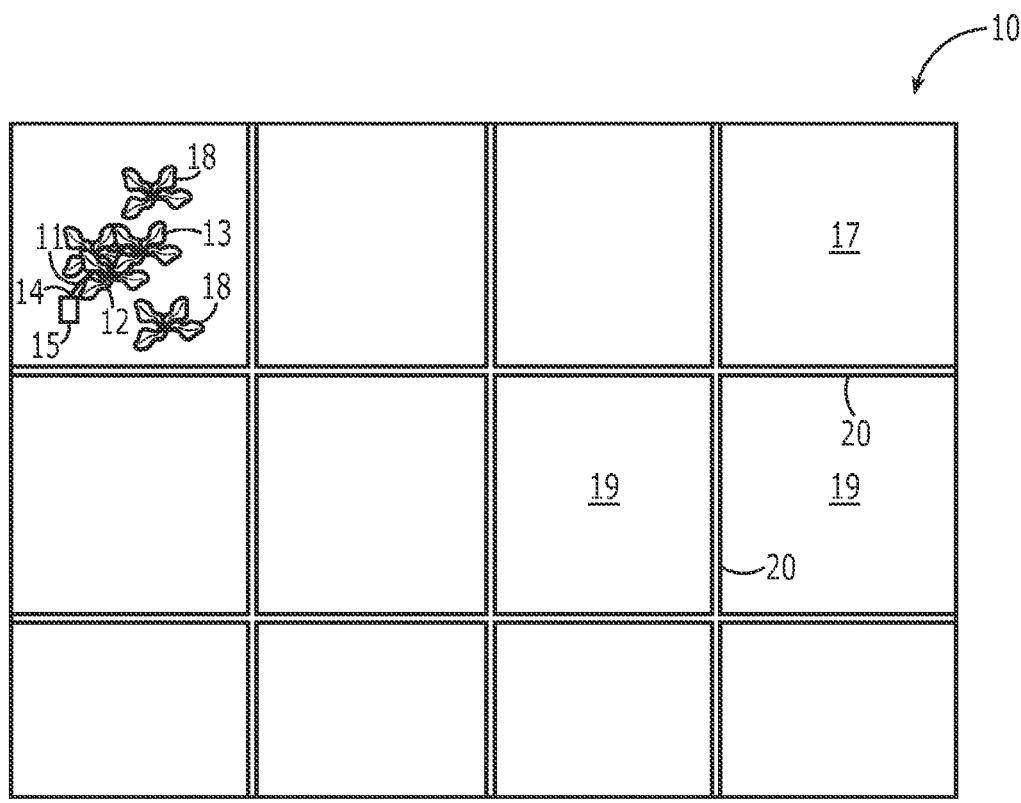
FIG. 1 is a top plan view of a wetland having plants growing on the surface.

The present invention is directed to a system 10 and method for enhancing rapid colonization of floating aquatic plants in water bodies. The invention comprises the use of a tether 11, one end 12 attached to one or a group of floating plants 13, and a second end 14 attached to a means 15 for affixing the tether to the bottom of the body of water 17, such as, but not intended to be limited to, an anchor, weight, or peg (FIG. 1). The affixing means 15 is then placed/attached to the bottom 16 of the body of water 17 (e.g., pond, reservoir, or wetland). The tether 11 can also have variable lengths to accommodate bodies of water 17 of varying and fluctuating depths. The tether 11 and/or affixing means 15 can be made of a biodegradable material that decomposes, for example, after a period of use, for example, a year.

For inoculating a large water body 17, these tethered plants 13 can be deployed from a boat or other vessel, which could include an airplane or helicopter, for example, at a certain spacing. Following deployment in the water body 17, each tethered "parent" plant or group of plants 13 produces daughter plants 18 that spread horizontally, since there is no crowding from adjacent plants or other spatial confinement. The tethered parent plant 13 acts as a nucleus of colonization, and the large water body 17 gradually fills with vegetation from each of these inoculation sites.

Tethered plants 13 can be deployed at the time of initial inoculation, and on an as-needed basis to fill in open water areas, for example, after harvest or otherwise removal of a portion of the standing crop biomass. Under high wind/current conditions, the mat of daughter plants 18 may become separated from the parent plant 13, but the parent plant 13 should remain to continue production of additional daughter plants 18.

Individual plants that are to be deployed in this fashion can be treated with a chemical compound (either foliar application, or as a "dunk") to kill pests or diseases prior to deployment in the pond. Further, such parent plants 13 can be provided with additional nutrition (either foliar application, or exposing roots to liquid fertilizers, or fastening a small vessel containing slow release fertilizers to the root mat) prior to deployment. Such fertilizer supplementation can consist of either of macro- or micro-nutrients. Both the exposure to nutrients and control of pests/diseases will result in more robust and productive parent plants.

In a particular embodiment, the body of water 17 can be segregated into sectors 19, for example, by floating containment booms 20, which can further limit the travel of untethered plants when exposed to high-wind and/or -current conditions.

In another embodiment 30 (FIG. 3), the plants 13 can be distributed across the water body in a manner designed to optimize nutrient uptake. For example, a plant density gradient can include a first plant density adjacent an inlet 31 to the body of water 17 being greater than a second plant density adjacent an outlet 32 of the body of water 17, since incoming water will be richer in nutrients than outflowing water.

In a further embodiment 40 (FIG. 4), plants 41 can be constrained in a cage-like device 42, which can have an openable top 43, or the device 42' can have an open top 44. In this embodiment 40, the cage 42,42' can be tethered 45 to the bottom 46 of the body of water 47 with a tethering means 48 known in the art. The cage 42,42' has openings 49 in at least one, and preferably all four, sides 50 thereof, as well as in the bottom 51. The openings 49 permit the plants 41 to extend rhizomes 52 out of the cage 42 in order to propagate additional plants 41. The cage 42,42' has affixed thereto a means 54 for floating on the surface 53 of the water 47, which preferably resides beneath the surface 53, so as not to inhibit rhizome 52 growth.

One benefit of this embodiment 40 is that under high wind conditions, for example, the cage 42,42' serves to keep a group of plants 41 from being torn away from the tether 45. The caged plants 41 can then begin to re-propagate after the storm.

Figure 2:
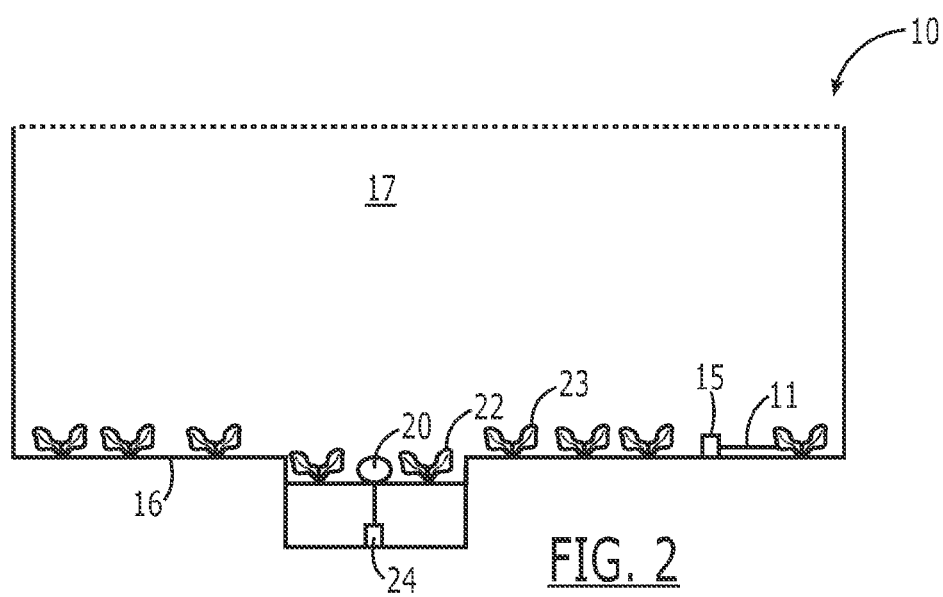
FIG. 2 is a side cross-sectional view of a nearly drained wetland as in FIG. 1.
Figure 3:
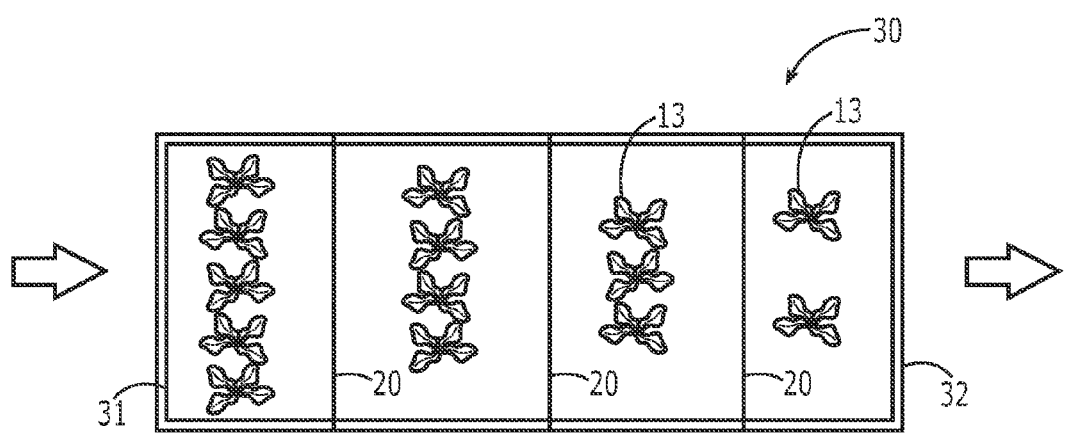
FIG. 3 is a top plan view of another embodiment of a wetland having plants growing on the surface.
Figure 4:
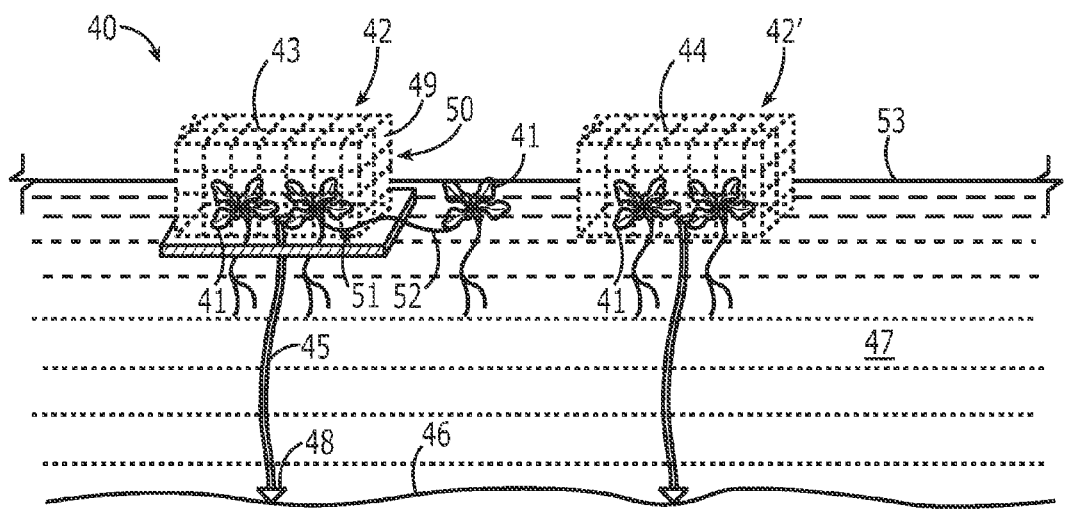
FIG. 4 is a side cross-sectional view of an embodiment using constrained groups of plants.

Also in a particular embodiment, the body of water 17 can comprise a plurality of canals 21 or other type of depression in the bottom 16 (FIG. 2). In some embodiments the canals 21 can be interconnected, although this is not intended as a limitation. Such canals 21 can be used to receive a sub-group of plants when the reservoir is drained, the canals 21 retaining some water so as to permit the plants 22 therein to live. When the water body 17 is drained to this level, the bottom 16 can be subjected to tilling, so that the plants 23 on the bottom 16 can be tilled into the soil at the bottom 16, but the plants 22 in the canals 21 survive to serve as seed plants to the next filling cycle. Alternatively, or in addition, restocking of the canal regions can also be used, to assist in repropagation. Under very dry conditions, water remaining in the canals 21 can be maintained by artificial means in order to keep the plants 22 alive until water is restored naturally.

In this embodiment, if containment booms 20 are used, they can be anchored 24 in the canals 21 so that they do not interfere with the tilling process.

Another process that can be implemented with any of these embodiments is the use, after tilling and prior to rehydration of the body of water, of a device to compact the soil, which assists in minimizing the export of the nutrients that have been incorporated into the plants, and to create a physical barrier to the release of nutrients from the soil. Further, an addition of chemical amendments such as known in the art to assist in sequestering nutrients can be practiced after the tilling step, which assists in creating a chemical barrier to the release of nutrients from the soil.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method of facilitating a rapid proliferation of floating aquatic plants on a body of water for use in bioremediation comprising the steps of:
   distributing a plurality of plants across a body of water so that at least some of the plants are sufficiently spatially distributed so as to avoid interfering with each other in an initial growth phase, at least some of the plants retained within a desired sector of the body of water, by distributing the plants in a density gradient from a water body inlet to a water body outlet, wherein a first plant density adjacent the water body inlet is greater than a second plant density adjacent the water body outlet;
   permitting the retained plants to produce daughter plants and to substantially cover a surface of the body of water;
   channeling water desired to be treated for excess nutrients to the body of water for bioremediation by the plants; and
   channeling treated water out from the body of water.

2. The method recited in claim 1, wherein the distributing step comprises tethering the retained plants to a bottom of the water body.

3. The method recited in claim 2, wherein the tethering step comprises affixing a first end of a tether to a plant and a second, opposed end of the tether to the water body bottom.

4. The method recited in claim 3, wherein the tether comprises a variable-length tether.

5. The method recited in claim 3, wherein the tether comprises a biodegradable material.

6. The method recited in claim 1, wherein the distributing step comprises deploying the plants from a vessel at a predetermined horizontal spacing.

7. The method recited in claim 1, wherein the distributing step comprises positioning a plurality of floating containment booms on the water body surface to create a plurality of sectors thereon.

8. The method recited in claim 1, wherein the plants are retained in cages having a plurality of openings in at least one side and a bottom thereof for permitting rhizome extension from the plants.

9. The method recited in claim 8, wherein the cages are tethered to a bottom of the water body.

10. The method recited in claim 9, wherein the cages are floatable, with at least the cage bottoms residing beneath the water body surface.

11. A method of facilitating a rapid proliferation of floating aquatic plants on a body of water for use in bioremediation comprising:
    distributing a plurality of plants across a body of water so that at least some of the plants are sufficiently spatially distributed so as to avoid interfering with each other in an initial growth phase, at least some of the plants retained within a desired sector of the body of water, wherein the water body has a bottom having a plurality of canals therein, a bottom of the canals lower than a bottom of adjacent segments of the water body bottom
    permitting the retained plants to produce daughter plants and to substantially cover a surface of the body of water;
    channeling water desired to be treated for excess nutrients to the body of water for bioremediation by the plants;
    channeling treated water out from the body of water;
    draining the water body to extent wherein only the canals retain water therein, the adjacent segments exposed;
    tilling the adjacent segments to mix the plants thereon with soil;
    reflooding the water body; and
    permitting the plants to repropagate with plants from the canals.

12. The method recited in claim 11, further comprising the step of adding water to the canals following the draining step as needed to retain sufficient water therein to support plants therein.

13. The method recited in claim 11, wherein the distributing step comprises positioning a plurality of floating containment booms on the water body surface to create a plurality of sectors thereon, the booms tethered to a bottom of a canal.

14. The method recited in claim 11, further comprising the steps, following the tilling step and prior to the reflooding step, of compacting the water body bottom to assist in segregating nutrients taken up by the plants from water added during the reflooding step.

15. The method recited in claim 11, further comprising the steps, following the tilling step and prior to the reflooding step, of adding chemical amendments to the water body bottom for assisting in segregating nutrients taken up by the plants from water added during the reflooding step.

16. A water bioremediation system comprising:
    a body of water;
    a plurality of plants distributed across a surface of the water body so that at least some of the plants are sufficiently spatially distributed so as to avoid interfering with each other in an initial growth phase, wherein the plants are distributed in a density gradient from a water body inlet to a water body outlet, wherein a first plant density adjacent the water body inlet is greater than a second plant density adjacent the water body outlet;
    a retaining device acting to retain at least some of the plants within a desired sector of the body of water, the retained plants capable of producing daughter plants and of substantially covering a surface of the body of water;
    means for channeling water desired to be treated for excess nutrients to the body of water for bioremediation by the plants; and
    means for channeling treated water out from the body of water.

17. The water bioremediation system recited in claim 16, wherein the retaining device comprises a tether having a first end affixed to a plant and a second, opposed end affixed to the water body bottom.

18. The water bioremediation system recited in claim 16, wherein the retaining device comprises a plurality of floating containment booms positioned on the water body surface to create a plurality of sectors thereon.

19. The water bioremediation system recited in claim 16, wherein retaining device comprises a plurality of cages having a plurality of openings in at least one side and a bottom thereof for permitting rhizome extension from the plants.

20. The water bioremediation system recited in claim 19, further comprising a plurality of tethers for affixing the cages to a bottom of the water body.

21. The water bioremediation system recited in claim 19, wherein the cages comprise a flotation material acting to position at least the cage bottoms beneath the water body surface.

22. A water bioremediation system comprising:
    a body of water, wherein the water body has a bottom having a plurality of canals therein, a bottom of the canals lower than a bottom of adjacent segments of the water body bottom;
    a plurality of plants distributed across a surface of the water body so that at least some of the plants are sufficiently spatially distributed so as to avoid interfering with each other in an initial growth phase;
    a retaining device acting to retain at least some of the plants within a desired sector of the body of water, the retained plants capable of producing daughter plants and of substantially covering a surface of the body of water;
    means for channeling water desired to be treated for excess nutrients to the body of water for bioremediation by the plants;
    means for channeling treated water out from the body of water;
    means for draining the water body to extent wherein only the canals retain water therein, the adjacent segments exposed;
    means for tilling the adjacent segments to mix the plants thereon with soil following draining the water body; and
    means for reflooding the water body following tilling, for permitting the plants to repropagate with plants from the canals.

23. The water bioremediation system recited in claim 22, wherein the retaining device comprises a plurality of floating containment booms positioned on the water body surface for creating a plurality of sectors thereon and a plurality of tethers affixed to the booms at a first end and to a bottom of a canal at a second, opposed end.

24. The water bioremediation system recited in claim 22, further comprising means for compacting the water body bottom following draining and prior to reflooding, to assist in segregating nutrients taken up by the plants from water added during the reflooding step.

25. The water bioremediation system recited in claim 22, further comprising means for adding chemical amendments to the water body bottom following draining and prior to reflooding, for assisting in segregating nutrients taken up by the plants from water added during the reflooding.

* * * * *